US009349056B2

(12) United States Patent
Peckover

(10) Patent No.: US 9,349,056 B2
(45) Date of Patent: May 24, 2016

(54) METHOD OF MEASURING ROAD MARKINGS

(71) Applicant: Gordon Peckover, St. Catharines (CA)

(72) Inventor: Gordon Peckover, St. Catharines (CA)

(*) Notice: Subject to any disclaimer, the term of this patent is extended or adjusted under 35 U.S.C. 154(b) by 226 days.

(21) Appl. No.: 14/171,881

(22) Filed: Feb. 4, 2014

(65) Prior Publication Data

US 2014/0233808 A1 Aug. 21, 2014

Related U.S. Application Data

(60) Provisional application No. 61/765,180, filed on Feb. 15, 2013.

(51) Int. Cl.
G06K 9/00 (2006.01)
G06T 7/40 (2006.01)
G06T 7/00 (2006.01)

(52) U.S. Cl.
CPC .......... *G06K 9/00798* (2013.01); *G06T 7/0051* (2013.01); *G06T 7/408* (2013.01); *G06T 2207/30256* (2013.01)

(58) Field of Classification Search
None
See application file for complete search history.

(56) References Cited

U.S. PATENT DOCUMENTS

| 4,985,847 A * | 1/1991 | Shioya | G01C 3/10 250/202 |
| 7,307,655 B1 * | 12/2007 | Okamoto | G06K 9/00791 348/222.1 |
| 7,315,241 B1 * | 1/2008 | Daily | G02B 27/01 340/332 |
| 8,374,438 B1 * | 2/2013 | Wagner | H04N 5/33 250/330 |
| 2003/0103649 A1 * | 6/2003 | Shimakage | G06K 9/00798 382/104 |
| 2004/0105579 A1 * | 6/2004 | Ishii | B60R 1/00 382/154 |
| 2004/0160595 A1 * | 8/2004 | Zivkovic | E01C 23/163 356/73 |
| 2005/0146725 A1 * | 7/2005 | Hansen | G01N 21/55 356/446 |
| 2005/0288891 A1 * | 12/2005 | Masuyama | E01C 23/01 702/167 |
| 2007/0075892 A1 * | 4/2007 | Horibe | G01S 17/023 342/70 |
| 2007/0280501 A1 * | 12/2007 | Walton | G01N 21/8806 382/100 |
| 2008/0317282 A1 * | 12/2008 | Unoura | G06K 9/00798 382/103 |
| 2011/0058031 A1 * | 3/2011 | Kurihara | G06K 9/2018 348/135 |
| 2012/0194677 A1 * | 8/2012 | Suzuki | G06K 9/00798 348/148 |
| 2013/0141577 A1 * | 6/2013 | Yoo | G01S 17/88 348/148 |
| 2013/0321582 A1 * | 12/2013 | Huang | G01B 11/303 348/46 |
| 2014/0193042 A1 * | 7/2014 | Allen | G06T 7/408 382/108 |

FOREIGN PATENT DOCUMENTS

| FR | EP 1089090 A1 * | 4/2001 | G01S 17/89 |
| JP | 06307844 A * | 11/1994 | |
| JP | 2009199284 A * | 9/2009 | |

OTHER PUBLICATIONS

"Road-Boundary Detection and Tracking Using Ladar Sensing," Wijesoma, W. S. et al, IEEE Transactions on Robotics and Automation, vol. 20, No. 3, June 2004, pp. 456-464.*

* cited by examiner

*Primary Examiner* — Wenpeng Chen

(57) ABSTRACT

A method of measuring road markings. The steps of which include first projecting a red laser line onto the road including a portion on the road surface and a portion on the road markings. Second, filter out all colors except red and convert to a grayscale image. Thirdly, separate image into one pixel wide columns and apply a filtering so only white pixels having a predetermined minimum brightness remain. Next, calculate the road-paint boundary to determine which columns belong to the road surface and which belong to road marking. Using linear regression, a line equation for points corresponding to the road surface is generated and extrapolated to convert the road marking measurements to a height.

17 Claims, 7 Drawing Sheets

Figure 1: Image Processing Sequence

Figure 2: Filtered Images

Figure 3: Number of white pixels in x axis of image versus Frequency and Significance Test

Figure 3A

Data: Histogram, $h$, $neighbours = \frac{|h|}{4}$
Result: Significance Value
$sig = \text{emtpy}()$;
for $x \in h.Values$ do
    hits = 0;
    for $j \in [1, neighbours]$ do
        if $h[x+j] < h[x]$ then
            | hits = hits + 1;
        end
        if $h[x+j] > h[x]$ then
            | hits = hits - 1;
        end
        if $h[x-j] < h[x]$ then
            | hits = hits + 1;
        end
        if $h[x-j] > h[x]$ then
            | hits = hits - 1;
        end
    end
    $sig[x] = \frac{hits}{neighbours}$;
end
return $sig$

Algorithm 1: Significance Test Algorithm

Figure 4: Graph of classified points and their representative lines

Figure 5: Camera/Laser placement

METHOD OF MEASURING ROAD MARKINGS

The present application claims priority from previously filed U.S. provisional patent application No. 61/765,180 filed Feb. 15, 2013 under the title METHOD OF MEASURING ROAD MARKINGS by Gordon Peckover.

FIELD OF THE INVENTION

The present invention relates generally to methods of evaluating road markings and more particularly to a method of measuring thickness of road markings applied to road surfaces.

BACKGROUND OF THE INVENTION

In this specification the term road marking means any indicia applied to the surface of a road to visually provide important information such as the location of lanes to users of a road. Road markings generally are painted onto the road surface however they can also be in many other forms such as thermoplastic tapes, molten thermoplastic sprays, extrusions and many other specialized paints.

The prior art describes methods of measuring road marking thicknesses using lasers and detecting the reflective laser beam off of markings and the surrounding road surface. The difficulties with the techniques described and patented in the prior art is that the road itself can often times be extremely rough and pitted leading to erroneous readings and secondly the painted line itself usually contains highly reflective material such as glass beads which are designed to reflect light and will also produce erroneous readings when measuring the thickness of the road markings.

Therefore there is a need for an efficient, quick and accurate method of measuring road markings that overcome the deficiencies found in the prior art.

SUMMARY OF THE INVENTION

The present concept is a method of measuring road markings includes the steps of:
 a) project a mono coloured laser beam line onto the road including a portion on the road surface and a portion on the road marking;
 b) take image readings with a camera to capture reflection of the laser beam;
 c) filter out all colours except laser colour;
 d) apply a thresh-hold filtering such that only a histogram of points having a predetermined minimum brightness remain;
 e) calculate the road-paint boundary; model the road surface under the road marking; and
 g) convert the road marking measurements to a height above the road surface.

Preferably wherein step c) is replaced with the following step:
c) filter out all colours except the laser colour and convert readings to a grayscale image;

Preferably wherein step d) is replaced with the following step:
d) separate image into one pixel wide columns of points and apply a thresh-hold filtering such that only white pixels having a predetermined minimum brightness remain;

Preferably wherein step e) is replaced with the following step:
e) calculate the road-paint boundary, thereby determining which columns of points belong to the road surface and which belong to road marking;

Preferably wherein step f) is replaced with the following step:
f) using linear regression create a line equation for points corresponding to the road surface and extrapolate the line under the road marking portion to model the road surface under the road marking;

Preferably wherein the laser colour is red.

Preferably wherein the image is converted to grayscale using the following formula:

$$g(p) = \frac{\alpha p \cdot \text{Red} + \beta p \cdot \text{Green} + \gamma p \cdot \text{Blue}}{3}$$

Preferably wherein the image is converted to grayscale using the following formula:

$$g(p) = \frac{\alpha p \cdot \text{Red} + \beta p \cdot \text{Green} + \gamma p \cdot \text{Blue}}{3}$$

wherein alpha equals 1, beta equals 0 and gamma equals 0 when the laser light colour is red.

Preferably wherein the threshold filtering of the image is applied using the following formula:

$$t(p) = \begin{cases} \text{white} & \text{if } p \cdot \text{Value} > 250 \\ \text{black} & \text{otherwise} \end{cases}$$

Preferably wherein the threshold filtering of the image is applied using the following formula:

$$t(p) = \begin{cases} \text{white} & \text{if } p \cdot \text{Value} > 250 \\ \text{black} & \text{otherwise} \end{cases}$$

Preferably wherein step e) is replaced with the following step:
e) calculate the road-paint boundary by applying a significance test which estimates the slope of the histogram to determine whether or not a point on the histogram is approaching a critical boundary point.

Preferably wherein if the slope is a local minima the value will be −1 and if the slope is a local maxima the value will be +1.

Preferably wherein the significance test of the image is applied using the following formula:

Data: Histogram, h, neighbours = $\frac{h}{4}$

Result: Significance Value
sig = empty ( );
for x ∈ h. Values do
  hits = 0

```
for j ∈ [1, neighbours] do
    if h[x + j] < h[x] then
        hits = hits + 1;
    end
    if h[x + j] > h[x] then
        hits = hits − 1;
    end
    if h[x − j] < h[x] then
        hits = hits + 1
    end
    if h[x − j] > h[x] then
        hits = hits − 1;
    end
end sig[x] = hits / neighbours;

end
```

Preferably further including the step of obtaining a vertical height from the histogram points by transforming them into three dimensional pixels namely voxels.

Preferably further including the step of converting voxels into mils using a known calibration image.

Preferably wherein the camera is a high speed camera.

The present concept is a method of measuring road markings includes the steps of:
a) project a red laser line onto the road including a portion on the road surface and a portion on the road marking;
b) take image readings with a high speed camera to capture reflection of the laser beam;
c) filter out all colours except red laser colour and convert readings to a grayscale image;
d) separate image into one pixel wide columns apply a thresh-hold filtering such that only readings having a predetermined minimum brightness remain;
e) calculate the road-paint boundary, thereby determining which columns belong to the road surface and which belong to road marking;
f) using linear regression create a line equation for points corresponding to the road surface and extrapolate the line under the road marking portion to model the road surface under the road marking; and
g) convert the road marking measurements to a height.

BRIEF DESCRIPTION OF THE DRAWINGS

The present concept will now be described with reference to the following drawings in which;

FIG. 3(A) is the mathematical representation of the significance test algorithm.

DETAILED DESCRIPTION OF THE PREFERRED EMBODIMENTS

The present concept has been developed to measure the thickness of reflective paint markings on road surfaces. The measure of the paint thickness determines the conformance to local standards and is indicative of the quality of the paint markings. If the thickness of the paint on the road surface does not meet standards then it is possible that the paint may not be seen by drivers or will deteriorate too quickly over time.

In order to measure the thickness of road markings many techniques have been developed however due to the uneven nature of the bare road surface accurate measurements of paint thicknesses which are of the order of 10 to 50 mils has found to be very difficult in practice.

Figure 6:
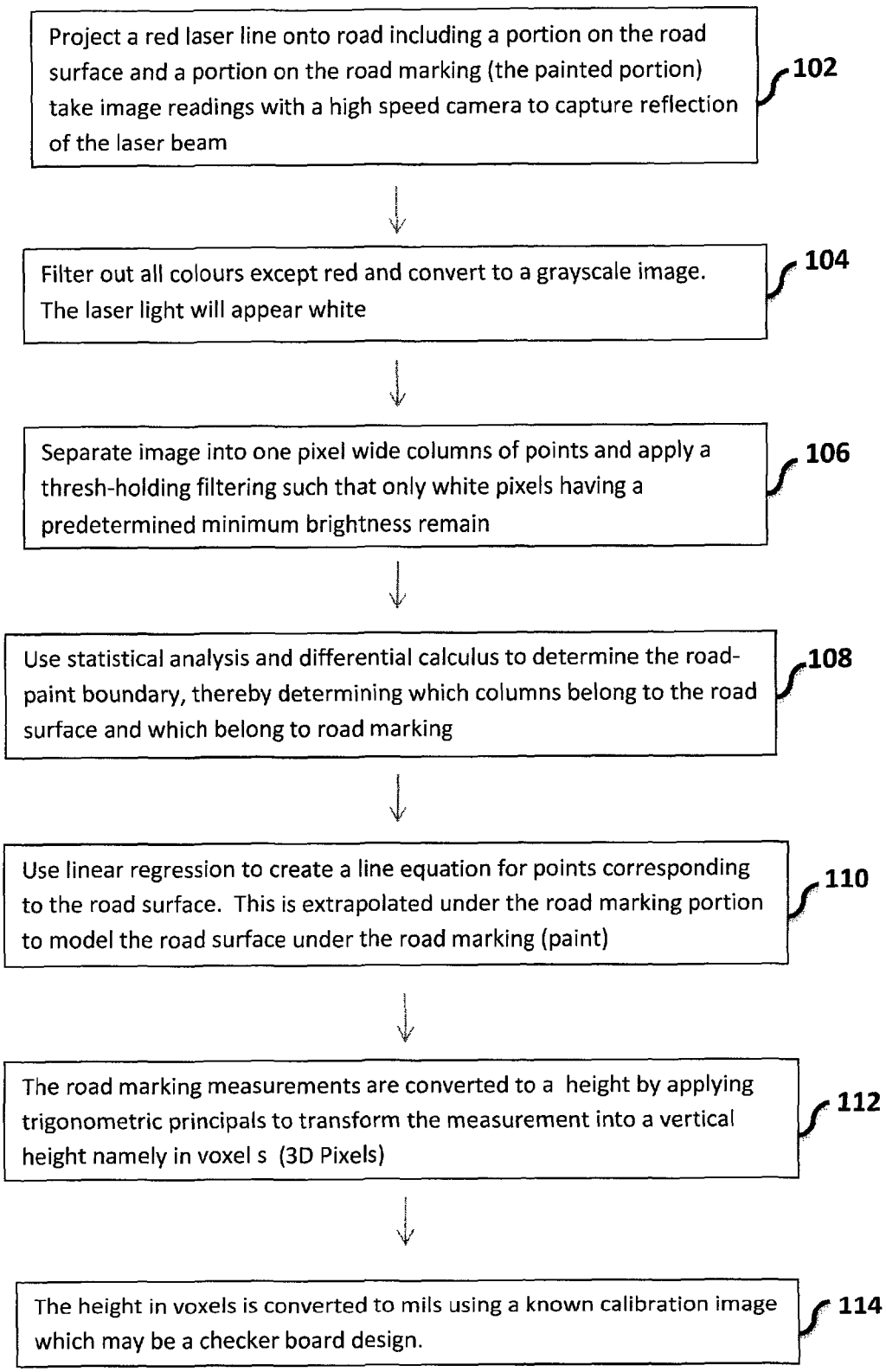
FIG. 6 is a flow diagram showing the steps of the method of measuring road markings in accordance with the present concept.

Referring first of all to FIG. 6 the steps involved in the method of measuring road markings is summarized in FIG. 6 and includes the following steps.

Step 1: Project a red laser line onto the road including a portion on the road surface and a portion on the road marking (the painted portion) shown as 102

Step 2: Filter out all colours except red and convert to a grayscale image. The laser light will appear white as shown in 104.

Step 3: Separate image into one pixel wide columns and apply a thresh-holding filtering such that only white pixels having a predetermined minimum brightness remain shown as 106.

Step 4: Use statistical analysis and differential calculus to determine the road-paint boundary (also referred to as a surface-marking boundary), thereby determining which columns belong to the road surface and which belong to road marking shown as 108.

Step 5: Use linear regression to create a line equation for points corresponding to the road surface. This is extrapolated under the road marking portion to model the road surface under the road marking (paint) shown as 110

Step 6: The road marking measurements are converted to a height by applying trigonometric principals to transform the measurement into a vertical height namely in voxels (3D Pixels) shown as 112.

Step 7: The height in voxels is converted to mils using a known calibration image which may be a checker board design shown as 114.

Referring now to all of the Figures a wide beam laser light mounted at a fixed height above the road surface is positioned normally at a 45 degree angle relative to the road. The laser projects onto a single or double road marking and also onto the adjacent bare road surface. One of more high speed cameras capture reflection of the laser beam from a fixed height and distance between the laser and the cameras is known.

Figure 1:
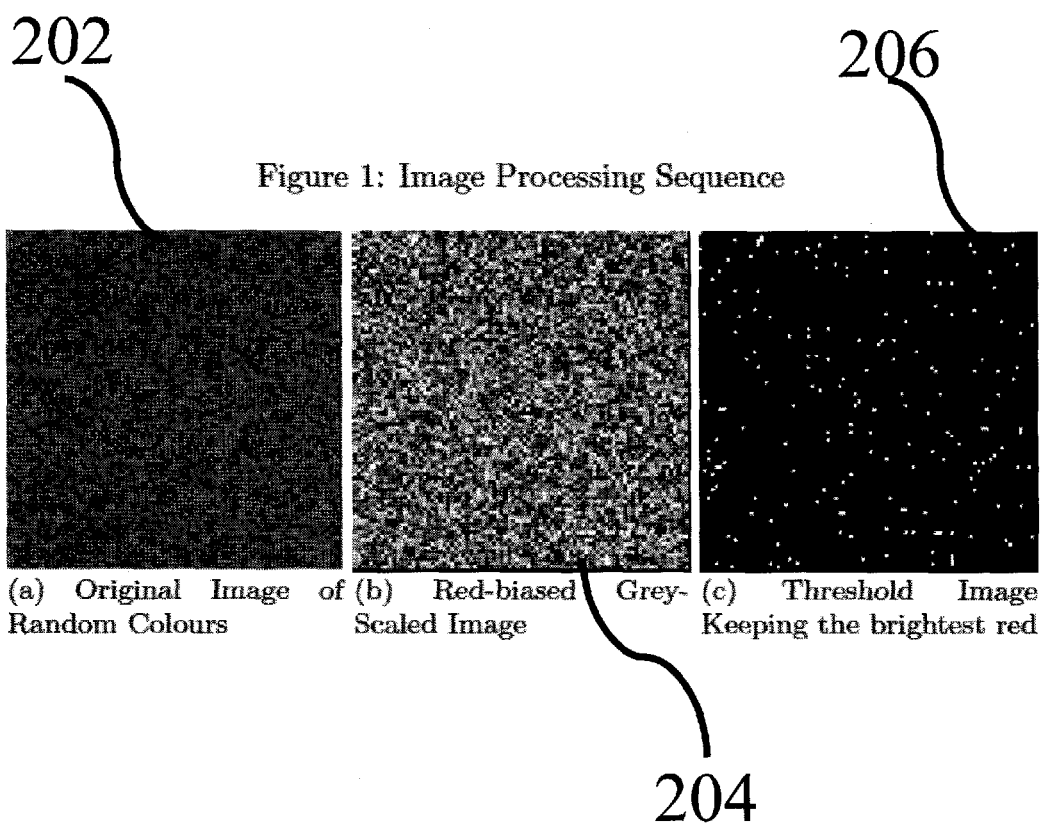
FIG. 1 is three images of the laser line shown as original condition and after converting to greyscale and after threshold filtering has been applied.

The image received by the cameras is turned to greyscale image based on the presence of red in the image. FIG. 1A for example is a picture of the original image as received by the cameras. FIG. 1B is an image of the greyscale image wherein only the red light is selected. Image 1C is a picture of the image wherein a threshold test is applied and only the brightest pixels are remaining.

Referring to FIGS. 1A, 1B and 1C as described above, the original image 202 is turned to a greyscale image 204 based on the presence of red. Then a threshold filtering is applied to this image and is turned into a black and white image wherein the laser is white and everything else is black as shown in FIGS. 1C 206.

Figure 2:
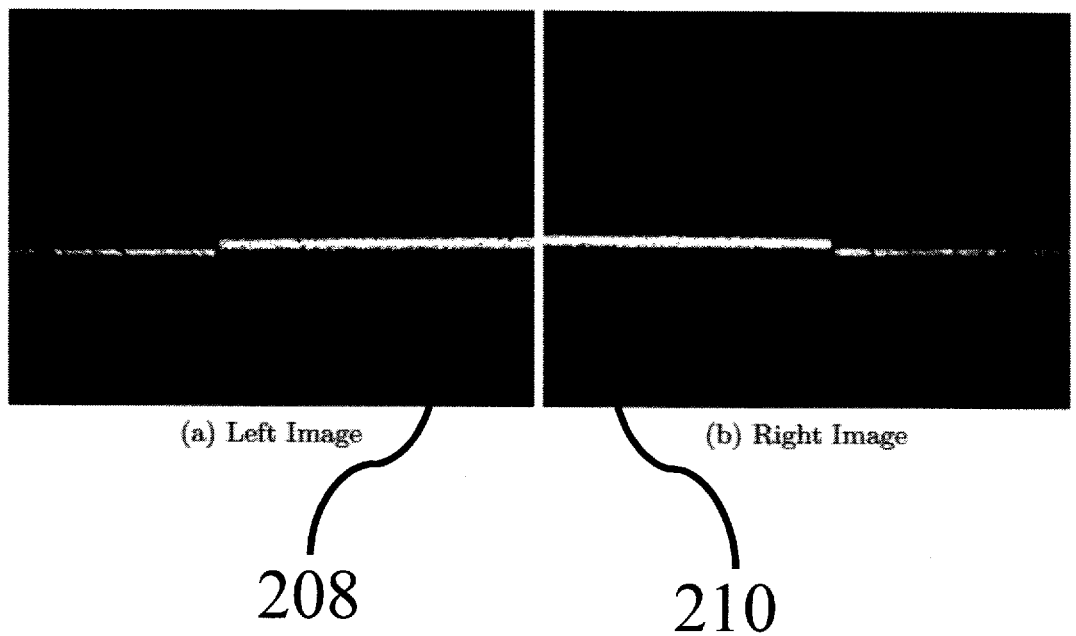
FIG. 2 is an optical image of the laser line after it has been converted to greyscale and undergone a threshold filtering process.

In order to identify which pixels are crossing the road and which are crossing the paint it is necessary to be aware of the difference. Examining the image we can remark that columns in the image where the laser crosses the paint contain a wide band of white as shown in FIG. 2 as opposed to columns where the laser is crossing only on the road being the peripheral portion of the image shown in FIG. 2. This is due to the reflective nature of the paint disbursing the laser light.

The first step in the measuring process is to remove the irrelevant information from the camera image. It is known in this application that the laser is red and therefore anything that does not contain red is removed from the image therefore what should be left in the images are only pixels containing laser light. The following equation 1 is used:

$$g(p) = \frac{\alpha p \cdot \text{Red} + \beta p \cdot \text{Green} + \gamma p \cdot \text{Blue}}{3} \quad (1)$$

The first step in doing this is to convert the image to a greyscale so that the amount of red information is maintained. In order to convert an image from a three channel red, green, blue image to a one channel white image an averaging technique to grey-scaling like equation 1 is applied. If alpha equals 1, beta equals 0 and gamma equals 0 then the only value that is maintained in the conversion is red. Now the image only contains a map of the intensities of red. Where red is at its peak intensity the map will be white as seen in FIG. 1B 204.

After this a filtering technique called thresh-holding is applied to the image. In this process the values from the previous step have equation 2 applied to each pixel where the value of the pixel (its whiteness) is in (0.255). After this is applied as seen in FIG. 1C the only white pixels that remain are the most red from the original image. Applying this to an image containing a laser and a road sample results in an image as seen in FIG. 2 shown as a left image 208 and a right image 210.

$$t(p) = \begin{cases} \text{white} & \text{if } p \cdot \text{Value} > 250 \\ \text{black} & \text{otherwise} \end{cases} \quad (2)$$

Figure 3:
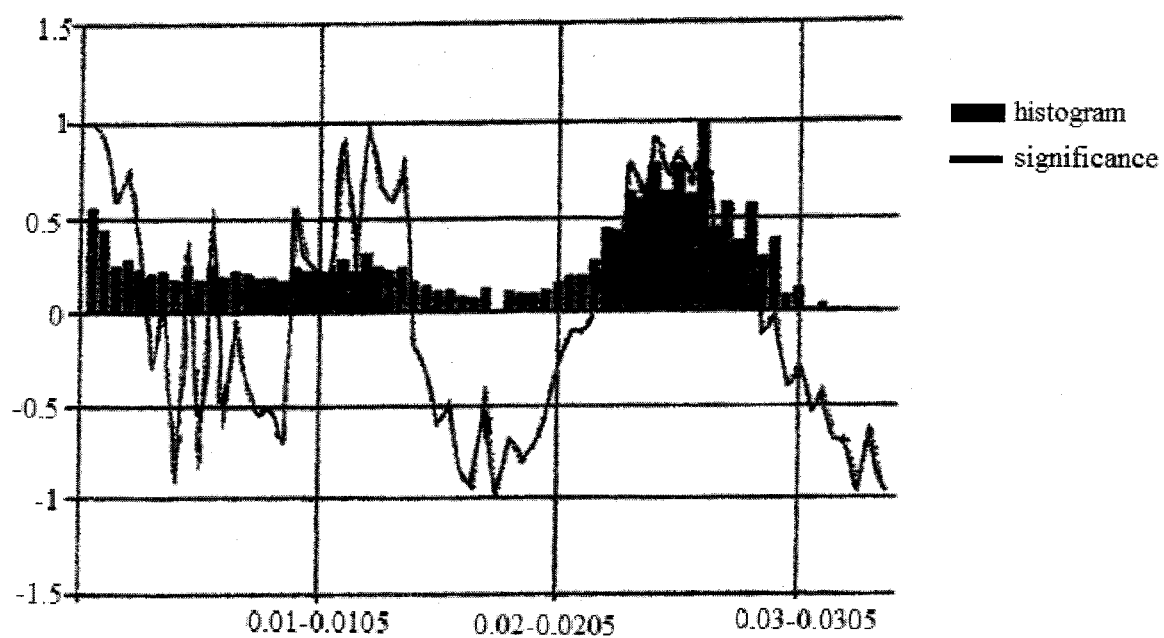
FIG. 3 is a graphical representation of the number of white pixels in X axis of the image versus the frequency and significance test.
Figure 4:
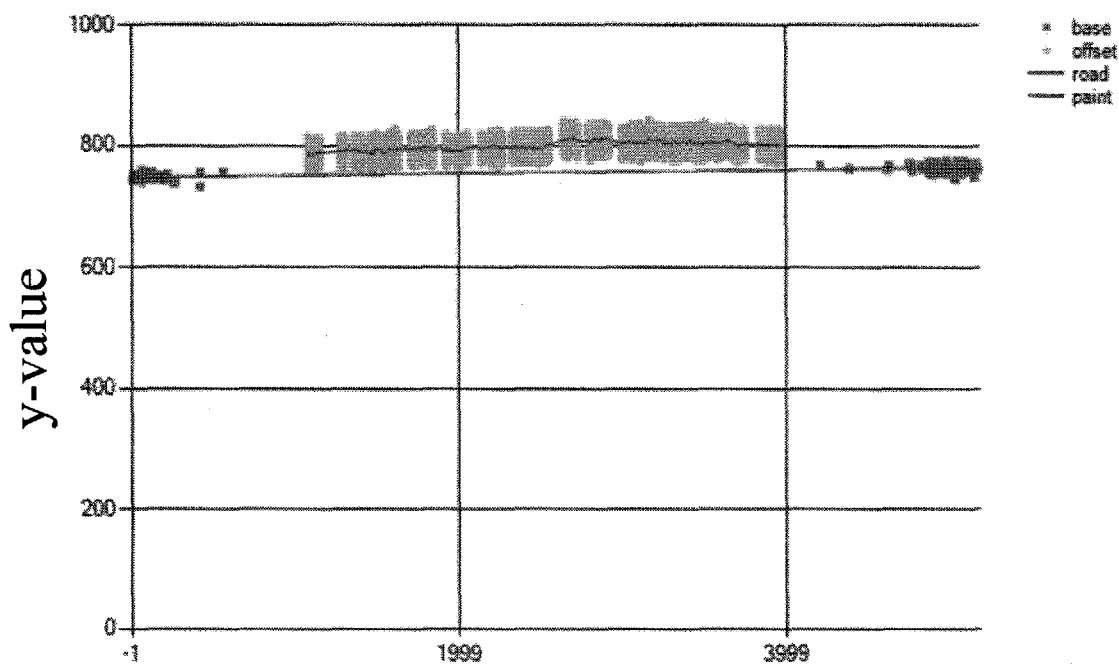
FIG. 4 is a graph of the classified points and their representative lines after linear regression and conversion to a height.

In order to measure the thickness of the paint using the processed image it is necessary to determine where the road and where the paint is in the image. Specifically, it is of interest to determine where the laser crosses the road and the paint. It can be observed in FIG. 2 that where the paint marking is (between the two images) that the laser seems "thicker" than when it crosses the road (on the outsides). This interesting property is due to the reflective nature of road paint. When the laser line hits the paint it reflects more light which spreads the beam in the view of the camera giving the illusion that it is wider now. It is easy, knowing this property, how to determine which parts of the laser cross the road and which cross the paint. However, statistical evaluation is necessary to determine where this is happening from a computers perspective. This is because there is no specific "thickness" of the laser line when it crosses the road and the paint with which a reliable quantity can be applied. The only element that is known is that the laser is "thinner" across the road and "thicker" across the paint. A histogram (See FIG. 3) show two hill tops or looking from a different angle it is like looking at two normally distributed groups side by side. The smaller group on the left near the centre contains those image columns such that the laser is crossing the road while the large group to the right contains those columns crossing the paint. Despite the clarity the human eye offers in interpreting the peeks in the histogram, this is difficult for a computer to perceive especially with interference in the signal of the histogram and the difference in the sizes of the hills. Finding all the local optima requires differential calculus. In order to find a local optima of a function ($f(x)$), Differential calculus suggests taking the derivative of the function ($f'(x)$) and evaluating the derivative where $f'(x)=0$. In order to simulate taking the derivative of a function, for which we do not know, we can take the slope of the histogram on either side of a point and see how close it is to the top of the hill. The Significance Test, introduced in Algorithm 1, (see also FIG. 3A) produces the desired effect by using an estimation examining whether or not a point in the histogram is approaching a critical point. If it is a local minima then the value will be −1 if it is a local maxima then 1. Referring again to FIG. 3 we can see the line represents the result of this algorithm peeking at the two hill tops. Taking all the points corresponding to the points of local maximum in the histogram provides a collection of road points and paint points. Samples collected and classification identified, all the information to begin measuring has now been accumulated. The first step is to measure the paint in terms of pixel distance. After which the process of converting it to a real and final measure is accomplished with a relative transformation and 3D reconstruction. In order to measure the paint, a point with which to measure from is necessary. For the purpose of this application this is the road. Since the road is often porous, picking a single reliable point to measure from is futile. Instead using linear regression, a line equation which is defined by the collected road points can be used to approximate what the flat trend of the road should look like. This offers a semblance of what the road looks like under the paint. As per equation (4) below and as illustrated in FIG. 4, and the average y-value for each x in paint sample collection can be measured for its distance to the road line.

$$m(x) = \sin\left(\frac{\pi}{4}\right)x \quad (3)$$

$$(4)$$

Data: Histogram, h, neighbours = $\frac{|h|}{4}$

Result: Significance Value
sig = empty ( );
for x ∈ h. Values do
   hits = 0
   for j ∈ [1, neighbours] do
     if h[x + j] < h[x] then
       hits = hits + 1;
     end
     if h[x + j] > h[x] then
       hits = hits − 1;
     end
     if h[x − j] < h[x] then
       hits = hits + 1
     end
     if h[x − j] > h[x] then
       hits = hits − 1;
     end
   end
end $$\text{sig}[x] = \frac{\text{hits}}{\text{neighbours}};$$

end

Figure 5:
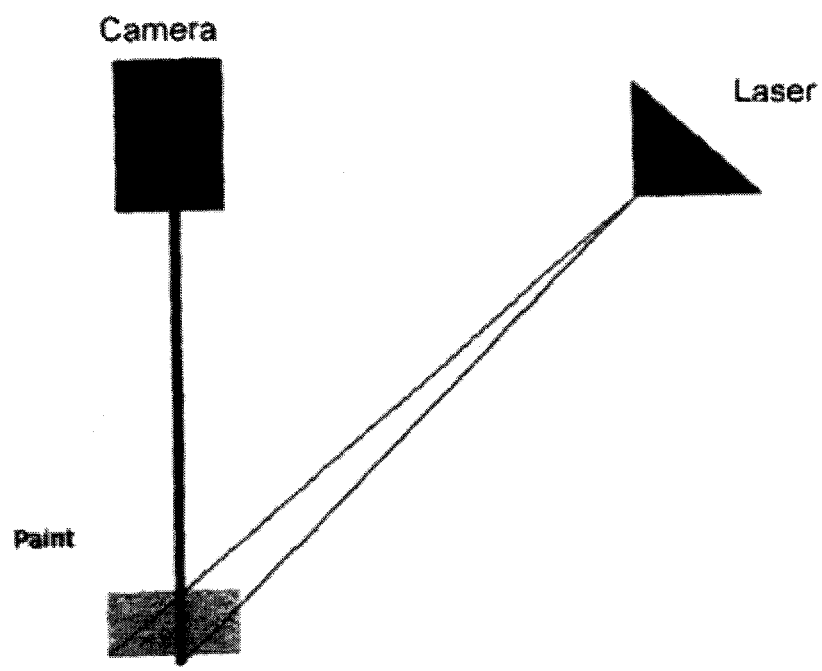
FIG. 5 is a schematic drawing showing the placement of a camera and a laser relative to the paint sample and the laser line and the reflections as seen by the camera.

The next step is to take this measure and converting it into a 3D space. This is accomplished by applying Equation 3 to the measure. This works because of what is actually seen by the camera. FIG. 5 shows the placement of the camera and the laser relative to a paint sample. What the camera actually sees is the hypotenuse of the black line that from the ground to the red laser. This is the measure that has been accumulated before transformation. The transformation as a result gives us the length of the red line while over the yellow sample. This is because sin (θ) is defined as the opposite over the hypotenuse. Since the opposite is our target rearranging this equation we get Equation 3. All that is left now is to convert this value from a voxel (3D pixel) space measure to real-world measure. This is accomplished using a calibration image. At the time of installation of the application, a calibration is conducted using a checker board with known real-world dimensions. Finding the corners of each square within the board and measuring the distance between pixels, a ratio between the pixels and mils can be used for converting later measures. That is to say, the ratio determines the value of each pixel (the surface length of the voxel) in mils and the measure we accumulated need only be multiplied by this ratio to obtain a real-world measure. The example image used here results in a measure of 34.08 mils where we were expecting 35 mils. This dynamic approach to measuring the thickness of road paint exploits the properties of the reflective paint and uses a novel approach to object identification using new statistical analysis approaches. It combats the weakness of other camera/laser measurement systems that require controlled environments and flat surfaces and improves upon conventional approaches to road paint measurement. And, it does so quickly and accurately. Other camera/laser systems require knowledge of the basis point for measurement and points are selected from the laser to identify a measure. However, these systems, often found in manufacturing are not capable of handling the porous nature of the road surface. The approach presented here is a novel approach to computing these measures combining new and old statistical approaches into a highly accurate algorithm. The algorithm also introduces a new statistic for object identification, namely the Significance Test. This approach allows inspection crews to more quickly obtain measures than before. Previous techniques required this sampling the paint and measuring the sample. This approach is cumbersome, invasive and dangerous. Crews can now place a box on the road, push a button and walk away safely, staying in the road way for far less time. Ultimately, this three-phased approach using image processing, object identification, 2D to 3D measuring offers a unique combination of techniques which provide a powerful and reliable metrological system.

It should be apparent to persons skilled in the arts that various modifications and adaptation of this structure described above are possible without departure from the spirit of the invention the scope of which defined in the appended claim.

I claim:

1. A method of measuring road markings includes the steps of:
   a) project a mono coloured laser beam line onto a road including a portion on a road surface and a portion on a road marking;
   b) take image readings with a camera to capture reflection of the laser beam line from the road;
   c) filter the image readings to filter out all colours except laser colour;
   d) apply a thresh-hold filtering to the filtered image readings to obtain points of the filtered image having at least a predetermined minimum brightness and create a histogram from the obtained points,
   e) calculate a surface-marking boundary based on the histogram;
   f) model the road surface under the road marking to generate road marking measurements based on the surface-marking boundary; and
   g) convert the road marking measurements to a height of the road marking above the road surface.

2. The method claimed in claim 1 wherein step c) is replaced with the following step:
   c) filter the image readings to filter out all colours except the laser colour and convert readings to a grayscale image.

3. The method claimed in claim 2 wherein step d) is replaced with the following step:
   d) separate image into one pixel wide columns of points and apply a thresh-hold filtering to the filtered image readings to obtain points of the filtered image having at least a predetermined minimum brightness and create a histogram from the obtained points.

4. The method claimed in claim 3 wherein step e) is replaced with the following step:
   e) calculate a surface-marking boundary based on the histogram, thereby determining which columns of points belong to the road surface and which belong to road marking.

5. The method claimed in claim 4 wherein step f) is replaced with the following step:
   f) model the road surface under the road marking to generate road marking measurements based on the surface-marking boundary and using linear regression create a line equation for points corresponding to the road surface measurements and extrapolate the line under the road marking portion to model the road surface under the road marking.

6. The method claimed in claim 3 wherein the threshold filtering of the image is applied using the following formula:

$$t(p) = \begin{cases} \text{white} & \text{if } p \cdot \text{Value} > 250 \\ \text{black} & \text{otherwise} \end{cases}.$$

7. The method claimed in claim 3 wherein step e) is replaced with the following step:
   e) calculate a surface-marking boundary by applying a significance test which estimates the slope of the histogram to determine whether or not a point on the histogram is approaching a surface-marking boundary point.

8. The method claimed in claim 7 wherein if the slope is a local minima the value will be −1 and if the slope is a local maxima the value will be +1.

9. The method claimed in claim 8 wherein the significance test of the image is applied using the following formula:

```
Data: Histogram, h, neighbours = |h|/4
Result: Significance Value
sig = empty ( );
for x ∈ h.Values do
    hits = 0
    for j ∈ [1, neighbours] do
        if h[x + j] < h[x] then
            hits = hits + 1;
        end
        if h[x + j] > h[x] then
            hits = hits − 1;
        end
        if h[x − j] < h[x] then
            hits = hits + 1
        end
        if h[x − j] > h[x] then
            hits = hits − 1;
        end
    end
    sig[x] = hits/neighbours;
end
```

10. The method claimed in claim 2 wherein the image is converted to grayscale using the following formula:

$$g(p) = \frac{\alpha p \cdot \text{Red} + \beta p \cdot \text{Green} + \gamma p \cdot \text{Blue}}{3}.$$

11. The method claimed in claim 1 wherein the laser colour is red.

12. The method claimed in claim 11 wherein the image is converted to grayscale using the following formula:

$$g(p) = \frac{\alpha p \cdot \text{Red} + \beta p \cdot \text{Green} + \gamma p \cdot \text{Blue}}{3}$$

wherein alpha equals 1, beta equals 0 and gamma equals 0 when the laser light colour is red.

13. The method claimed in claim 1 wherein the threshold filtering of the image is applied using the following formula:

$$t(p) = \begin{cases} \text{white} & \text{if } p \cdot \text{Value} > 250 \\ \text{black} & \text{otherwise} \end{cases}.$$

14. The method claimed in claim 1 further including the step of obtaining a vertical height from the histogram points by transforming them into three dimensional pixels namely voxels.

15. The method claimed in claim 14 further including the step of converting voxels into mils using a known calibration image.

16. The method claimed in claim 1 wherein the camera is a high speed camera.

17. A method of measuring road markings includes the steps of:
   a) project a red laser line onto a road including a portion on a road surface and a portion on a road marking;
   b) take image readings with a high speed camera to capture reflection of a laser beam;
   c) filter out all colours except red laser colour and convert readings to a grayscale image;
   d) separate image into one pixel wide columns apply a thresh-hold filtering such that only readings having a predetermined minimum brightness remain;
   e) calculate a road-paint boundary, thereby determining which columns belong to the road surface and which belong to the road marking;
   f) using linear regression create a line equation for points corresponding to the road surface and extrapolate a line under a road marking portion to model the road surface under the road marking; and
   g) convert the one pixel wide column readings having a predetermined minimum brightness to a height.

\* \* \* \* \*